Sept. 26, 1950   A. G. BROWN   2,523,530
REFRIGERATING APPARATUS UTILIZING DRY ICE
Filed Dec. 14, 1946

INVENTOR
ALFRED G. BROWN
BY
Mason & Graham
ATTORNEYS

Patented Sept. 26, 1950

2,523,530

UNITED STATES PATENT OFFICE 2,523,530

REFRIGERATING APPARATUS UTILIZING DRY ICE

Alfred G. Brown, Los Angeles, Calif.

Application December 14, 1946, Serial No. 716,317

4 Claims. (Cl. 62—91.5)

My present invention has to do with refrigeration by novel control and direction of expansible gases, particularly $CO_2$. This is a continuation-in-part of my copending application Serial No. 482,400, filed April 9, 1943 and which became Patent No. 2,512,916 on June 27, 1950, and has more particularly to do with improved apparatus for carrying out refrigeration by $CO_2$.

$CO_2$ is one of the most compressible of industrial gases, being capable of expanding to many hundred times its compressed volume—that is, from its storage state as "Dry Ice"—and while the refrigerating qualities of Dry Ice are well known, so far as I am aware no one has before obtained the phenomenal efficiency in refrigerating by the use of Dry Ice that I have achieved with my improved apparatus.

In general, I attribute the unusual success of my apparatus, among other things, to the arrangement of heat exchange surfaces and gas passageways in a manner not only to provide excellent insulation, but also to expose the gas alternately to relatively high and relatively low temperature heat exchange media in a plurality of cycles while continuously releasing a portion of the expanded gas. By this structure and procedure I accomplish what appear to be cycles of alternate expansion and contraction which, in my said copending application, I have designated as "multiple expansion."

It is therefore an aim of my present invention to provide a novel refrigerating unit of this character wherein the solidified $CO_2$ is slowly sublimated and the resultant gases so directed as to obtain maximum refrigerating efficiency.

More particularly it is an object of the invention to provide a casing in which the Dry Ice is contained and slowly sublimated and which has spaced, nested heat exchange surfaces along which the gas is directed to alternately expose it to heat exchange media of relatively high and relatively low temperatures and from which a portion of the expanded gas is continuously released.

My invention also contemplates the provision of a novel cold storage structure utilizing one or more of my individual refrigerating units.

Still further objects and corresponding advantages will become apparent from the following description of a presently preferred embodiment of the invention, for which purpose I shall refer to the accompanying drawings wherein.

Figure 1:
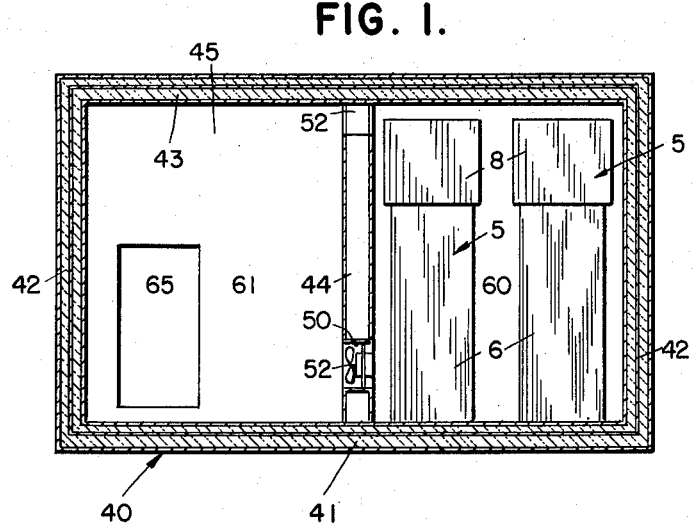
Fig. 1 is a vertical section of a cold storage structure made in accordance with my invention and utilizing a plurality of my individual refrigerating units.

It will be understood, of course, that, within the broader scope of the invention as defined by the appended claims, I do not intend that my invention shall be limited to the precise details illustrated in the drawings and now to be described, inasmuch as the ensuing explanation will suggest to those skilled in this art further modifications which are within the purview of the invention.

Figure 3:
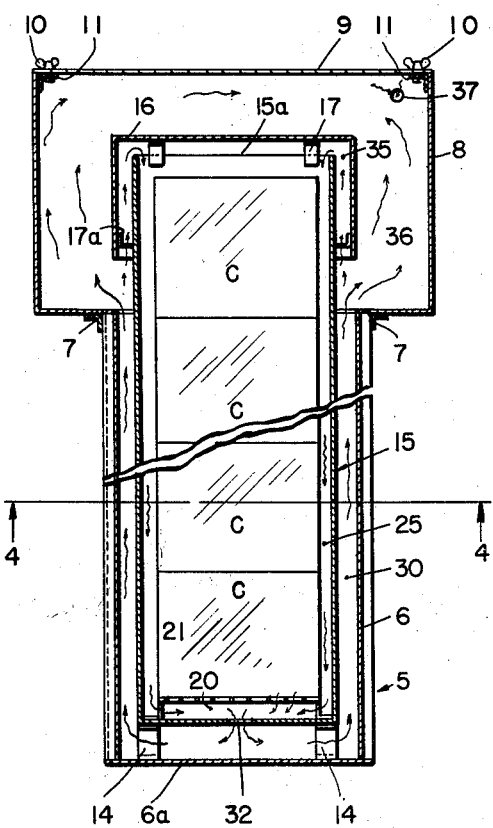
Fig. 3 is a medial vertical section of a refrigerating unit made in accordance with my invention.
Figure 4:
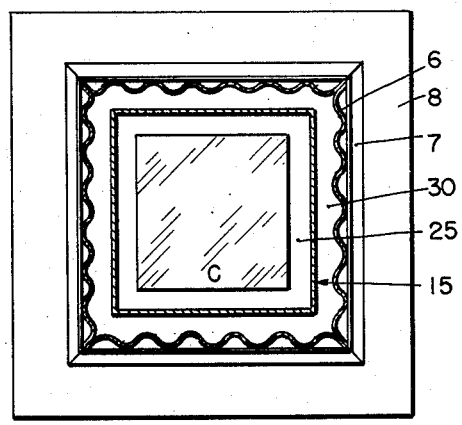
Fig. 4 is a section on line 4—4 of Fig. 3.

Referring now to the drawings, I show, in Figs. 3 and 4, one of my refrigerating units generally designated by the numeral 5, wherein I utilize an outer casing 6 whose side walls are corrugated so as to present a maximum heat exchange surface. This outer casing has a bottom wall 6a closing its bottom end and is open at its top. However, on the top end of the outer casing I mount in sealed engagement therewith, as by means of angle iron brackets 7, an outer hood 8 whose open top end is sealed by cover plate 9 secured thereon by bolt and wing nut assemblies 10, the bolts of which pass through brackets 11 and thence through holes in the cover 9.

Nested in the outer casing and resting upon spacer blocks 14, there is an inner casing, or Dry Ice container, 15 which is open at its top end 15a.

The inner hood 16 is mounted on the open top end of the inner casing by spacer brackets 17, 17a.

A foraminated shelf 20 is disposed in the bottom of the inner casing 15 to support the blocks C of Dry Ice in spaced relationship not only to the bottom wall of the inner casing but also to the side walls thereof. Shelf 20 is supported on angle iron brackets 21.

Preferably I provide units 5 each of whose inner casings has a Dry Ice capacity of about five 52-pound blocks of Dry Ice which may or may not be wrapped in paper or the like, and the Dry Ice is so supported in each inner casing that the side walls of the blocks are spaced from the inner surface of the inner casing so as to provide a gas passageway 25 approximately 1½ inches wide extending along the sides of the blocks and beneath the shelf 20. The spacing of the side walls of the inner and outer casings provides a gas passageway 30 approximately 2 inches wide. Passageways 25 and 30 communicate with each other at their bottoms through an opening 32 in the bottom wall of the inner casing, which opening is approximately 2 inches square. The spacing of the inner hood 16 from the side walls and top end of the inner casing provides a gas passageway 35 and the spacing of the outer hood 8 from the inner hood provides an expansion chamber 36, the outer hood having a restricted discharge opening 37 near its top, which opening is approximately 1½ inches in diameter.

The outer and inner casings 6, 15, the outer hood 8, and the shelf 20 are made of a suitable metal such as sheet steel having good heat transfer qualities. Inner hood 16 may be of said metal or may be of other material such as plywood. The inner casing is approximately 12 inches square in cross section, while the outer casing is approximately 16 inches square in cross section. The outer hood is approximately 19 inches square and the inner hood is approximately 13½ inches square in cross section.

In use, as the Dry Ice sublimates, the gas moves downwardly along passageway 25 and, upon reaching the bottom of the passageway, some of it will pass through opening 32, apparently some of it will pass upwardly along the inner surface of the side wall of the inner casing until it encounters and entrains with colder downwardly moving gas, and apparently some of it will pass upwardly along passageway 30. Upon reaching chamber 36 some of the gas will enter the passageway 35 and recirculate and some of it will pass out through opening 37. Thus it appears that the gas, in passing from the initial sublimation to its final expansion, undergoes cycles of expansion and contraction, and the defined pasageways, being filled with gas, provide excellent insulation.

Figure 2:
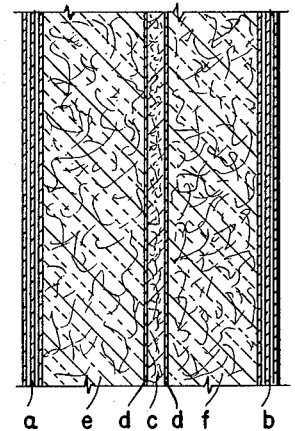
Fig. 2 is an enlarged fragmentary section of one of the walls of the cold storage structure.

While the unit 5 may be employed in any desired type of cold storage room or apparatus, I show in Figs. 1 and 2 a cold storage cabinet which I find to provide unusual efficiency in conjunction with the novel refrigerating unit above described.

Here I show a rectangular cabinet 40 having bottom wall 41, end walls 42, top wall 43, a partition wall 44 and side walls 45. Walls 41—43 and 45 are constructed as best shown in Fig. 2, each having an outer wall portion *a* and an inner wall portion *b* consisting of five-ply plywood, and intermediate wall portion *c* of a heat insulating composition such as "Celotex" faced on each side with a sheet of paper *d* and the spaces *e* and *f* between the intermediate wall and the outer and inner walls are filled with a heat insulating material such as mineral wool.

I prefer to make the intermediate wall 44 of heat exchange material and provide near the bottom one or more openings 50, in each of which is mounted a motor driven blower 52, the blowers pulling gas from the refrigerating unit-containing chamber 60 and discharging it into the cold storage chamber 61. As the gas absorbs heat in chamber 61 and further expands, it passes through the opening 52 in the top of wall 44 into chamber 60.

The gas which finally emerges through the opening 37 in each of the units 5 is thus circulated and recirculated through the cold storage chamber and around the heat exchange surfaces 6, 8 until, in its state of final expansion, it seeps through the walls of the cabinet 40, for which purpose small openings are provided in the wall portions *a*, *b* and *c*.

An access door 65 is provided in one of the side walls 45 of the cabinet.

I claim:

1. Refrigerating apparatus comprising a closed outer casing having side walls of heat exchange material and presenting a restricted gas outlet opening in one of its walls, an inner open topped casing whose side and bottom walls are of heat exchange material and whose bottom wall has a restricted opening therein, a Dry Ice supporting shelf mounted medially in the inner casing in spaced relation to the bottom thereof, said shelf defining with the bottom of the inner casing a gas passageway beneath and around the edges of the shelf, and an open bottomed hood supported on the top end portion of the inner casing with its side and top walls overlapping and in spaced relation thereto whereby to provide a gas passageway therebetween, said inner casing and its carried hood being nested in the outer casing with their walls in spaced relation thereto whereby to provide a gas passageway therebetween in communication with said other gas passageways.

2. Refrigerating apparatus comprising a closed outer casing having side walls of heat exchange material and presenting a restricted gas outlet opening in one of its walls, the uppermost portion of said outer casing being larger in cross section than the lower portion thereof, an inner open topped casing whose side and bottom walls are of heat exchange material, a Dry Ice supporting shelf mounted medially in the inner casing in spaced relation to the bottom thereof, said shelf defining with the bottom of the inner casing a gas passageway beneath and around the edges of the shelf, and an open bottomed hood supported on the top end portion of the inner casing with its side and top walls overlapping and in spaced relation thereto whereby to provide a gas passageway therebetween, said inner casing and its carried hood being nested in the outer casing with their walls in spaced relation thereto whereby to provide a gas passageway therebetween in communication with said other gas passageways.

3. Refrigerating apparatus comprising an outer closed metallic casing whose top end portion is larger in cross section than its bottom portion, an inner metallic, open topped casing nested in the outer casing with its side and bottom end walls spaced from the side and bottom walls of the outer casing, the top portion of the inner casing extending into the top end portion of the outer casing and the bottom end wall of the inner casing having a restricted opening therethrough, a Dry Ice supporting shelf mounted medially in the inner casing in spaced relation to the bottom thereof, said shelf defining with the bottom of the inner casing a gas passageway beneath and around the edges of the shelf, and an inverted hood mounted on and in overlapping spaced relationship to the top end portion of the inner casing and with its side walls spaced from the side walls of the top end portion of the outer casing, said outer casing having a restricted gas outlet.

4. Refrigerating apparatus comprising a closed outer casing having corrugated side walls of heat exchange material and presenting a restricted gas outlet opening in one of its walls, an inner open topped casing whose side and bottom walls are of good heat exchange material, a Dry Ice supporting shelf mounted medially in the inner casing in spaced relation to the bottom thereof, said shelf defining with the bottom of the inner casing a gas passageway beneath and around the edges of the shelf, and an open bottomed hood supported on the top end portion of the inner casing with its side and top walls overlapping and in spaced relation thereto whereby to provide a gas passageway therebetween, said inner casing and its carried hood being nested in the outer casing with their walls in spaced relation thereto whereby to provide a gas passageway therebetween in communication with said other gas passageways.

ALFRED G. BROWN.

REFERENCES CITED

The following references are of record in the file of this patent:

UNITED STATES PATENTS

| Number | Name | Date |
|---|---|---|
| 1,975,177 | Sherrick | Oct. 2, 1934 |
| 2,090,590 | Clarke | Aug. 17, 1937 |
| 2,263,522 | Scott | Nov. 18, 1941 |

FOREIGN PATENTS

| Number | Country | Date |
|---|---|---|
| 552,672 | Germany | June 16, 1932 |